United States Patent Office 2,891,874
Patented June 23, 1959

2,891,874

PROCESS FOR INCREASING SOIL-RESISTANCE OF FIBERS, A COMPOSITION THEREFOR AND PROCESS FOR PRODUCING IT

Ralph Aarons and Rudolph Schlatter, Brandywine Hundred, Del., assignors to E. I. du Pont de Nemours and Company, Wilmington, Del., a corporation of Delaware No Drawing. Application March 7, 1957
Serial No. 644,459

6 Claims. (Cl. 106—287)

This invention relates to compositions for increasing the soil-resistance of fibers, to methods for making the compositions, and to processes for treating fibers with the compositions, and is more particularly directed to such compositions comprising aluminum formate and silica sols in which the silica is present as substantially discrete particles having an average diameter of 3 to 150 millimicrons, the compositions having a pH of from 3.0 to 5.5 and preferably from 4 to 5, and the silica:alumina weight ratio being from 30:1 to 3:1, preferably from 25:1 to 10:1; to processes for making such sols comprising adding a silica sol of the type described to an aqueous aluminum formate solution having an aluminum:formate mol ratio of up to 1:2 and preferably from 1:6 to 1:2, and analyzing not less than .3% by weight of aluminum formate, expressed as $Al_2O_3$, under conditions of substantially instantaneous mixing; and to processes for increasing the soil-resistance of fibers comprising immersing a fiber in a bath composition of the invention whereby a component of the bath is deposited upon the fiber, withdrawing the fiber from the bath, replenishing the depleted bath component, and again immersing a fiber in the bath.

The novel compositions have a combination of desirable properties not hitherto available in silica textile-treating baths. The silica and alumina can be exhausted onto textile fibers, such as rayon, merely by immersing the fibers in an aqueous bath, and the rate of exhaustion is more rapid than with other treating baths heretofore proposed. The compositions are sufficiently stable against gelation or precipitation that they can be used according to industrially practicable procedures. They do not tenderize textiles—even such sensitive fibers as viscose rayon. They are compatible with conventional softeners, including anionic surface-active agents, no instability being evident in the mixtures. The "hand" of the treated fibers is softer and more pleasing than the hand of fibers treated with silica according to many of the procedures hitherto suggested.

The present invention is concerned with baths and processes in which the silica is "exhausted" onto fibers by immersion, that is, the silica is deposited upon the fibers by contact and the silica concentration in the bath is proportionately reduced. Exhaustion is not to be confused with methods wherein a silica sol is sprayed on or otherwise applied to fibers and silica deposition is effected by evaporating off the carrier liquid. Neither is it to be confused with precipitation methods wherein the silica in a sol is precipitated in the presence of the fibers by adding a precipitating agent. The evaporation technique involves undue expense for heat to evaporate the carrier liquid, while the precipitation technique involves batch, rather than continuous, operations and is accompanied by settling and other problems which result in non-uniform coating of the fibers.

It will be understood that certain agents, such as aluminum salts of strong acids e.g. aluminum sulfate, act as precipitants, but slowly, so that it is possible to immerse the fibers in a bath of the salt, then add the silica sol and thereby effect exhaustion of the silica onto the fibers, without effecting deleterious precipitation of the silica in the bath. However, if one attempts to reuse such a bath, or use a bath made by mixing the aluminum sulfate and silica before treating the fibers it is found that objectionable precipitation or gelation has occurred. On the other hand, commercial procedures for treating fibers make the use of a one-bath process very desirable, and there is a definite need for a stable silica sol treating bath from which the silica will exhaust upon fibers.

Now according to the present invention it has been found that at a pH of 3.0 to 5.5, preferably from 4 to 5, aluminum formate is compatible with silica sols of substantially discrete particles 3 to 150 millimicrons in diameter, at an $SiO_2:Al_2O_3$ weight ratio of 30:1 to 3:1, preferably 25:1 to 10:1, and this compatibility is such that it is entirely practicable, by adding the silica sol to an aluminum formate solution having an aluminum to formate mol ratio of up to 1:2 and preferably from 1:6 to 1:2, to make up a treating bath and to use this bath through several treating cycles without precipitation or gelation.

Silica sols for use in making the compositions of this invention can be made by a variety of methods with which the art is already familiar. Sols made by the conventional method of acidifying a sodium silicate solution contain particles smaller than 3 millimicrons and are not suitable unless further treated to grow the particles into the desired size range. The same is true for sols made by such methods as hydrolyzing the orthoesters of silicic acid or removing the sodium in sodium silicate solutions by ion exchange. However, the silica particles can be grown in size, after removal of salts, etc., by heating under build-up conditions, and the size of the particles may thus be adjusted to any size within the desired range. Thus, the particles can be grown into the range of 5 to 8 millimicrons by alkalizing the sol to an $SiO_2$: alkali oxide mol ratio of from 30:1 to 150:1, heating the alkalized sol to a temperature of from 50 to 125° C. whereby the ultimate silica particles are grown to a size corresponding to a surface area of 350 to 600 square meters per gram, bringing the sol into contact with a cation- and an anion-exchanger to remove substantially all salts therefrom, and alkalizing the sol to an $SiO_2$: alkali oxide mol ratio of from 20:1 to 500:1, all as more fully taught in United States application Serial No. 412,627, filed February 25, 1954, by Guy B. Alexander.

The particles can be grown to an even larger size by the build-up techniques described in United States Patent 2,574,902, issued November 13, 1951, to Max F. Bechtold et al.

It will be noted that the procedures just described are adapted to give sols of particles which are substantially discrete. The sols are practically water clear and the viscosity, even at $SiO_2$ concentrations of 15% or more is not much greater than that of water, indicating the absence of agglomerates. There may be some twins and even triplets, but the majority of the particles are single spheres.

While the size of the silica particles in the sol can be, broadly, in the range of 3 to 150 millimicrons, it is greatly preferred to use sols in which the particles are in the range of 5 to 20 millimicrons and especially preferred that the size be 5 to 9 millimicrons. In the range between 3 and 5 millimicrons it is somewhat difficult to insure freedom from aggregation or agglomeration, while in the range of 20 to 150 millimicrons the kinds of soil against which the silica coating affords protection is increasingly restricted.

The silica sol can be either dilute or concentrated. The silica sol is ordinarily supplied commercially in concentrations of 15 to 30% $SiO_2$. Stable compositions containing up to 20% $SiO_2$ can be prepared by adding such concentrated silica sols directly to a concentrated solution of aluminum formate salt. The reverse order of addition leads to flocculation or precipitation of the active ingredients from solution. It is possible to prepare compositions of the invention by adding either a concentrated or a dilute silica sol, that is, having a concentration of from 5 to 30% $SiO_2$, to a concentrated or dilute aluminum formate solution; however, it is preferred to add the silica sol to a concentrated aluminum formate solution. If the silica sol is added to a dilute aluminum formate solution, for example a solution analyzing less than .1% equivalent $Al_2O_3$, a cloudy, less stable, but usable composition is obtained. When however, the silica sol is added to a concentrated aluminum formate solution, for example a solution containing .3% or more of equivalent $Al_2O_3$, a slightly opalescent solution, which has excellent stability is obtained.

Since one of the advantages of the invention is that the silica is exhausted from dilute baths onto the fiber being treated, it will be seen that use of dilute sols is entirely practicable. In a preferred aspect of the invention, compositions are made by diluting the silica sol to about 5% or less of silica and very rapidly adding the diluted sol to a concentrated aluminum formate solution. If the silica concentration in such compositions is higher than required, treating baths can be made merely by diluting the compositions, preferably at the time of use.

The aluminum formate used in making a composition of this invention should have an Al:formate mol ratio of 1:2 or less and preferably from 1:2 to 1:6, and after mixing with the silica sol the ratio of aluminum to unneutralized formate should be in the range of 1:1.5 to 1:3, the mixture having a pH in the range of 3.0 to 5.5. The term "aluminum formate" will be understood to include compounds such as those described, in which the ratio of aluminum to formate is 1:2 or less. For use with an alkali-stabilized silica sol having an $SiO_2:Na_2O$ weight ratio of about 285, for example, a basic aluminum formate $AlOH(OOCH)_2$, can be used to advantage.

The concentration of aluminum formate in the solution to which the silica sol is added in making a composition of the invention according to the preferred practice should be not less than that equivalent to about .3% $Al_2O_3$, preferably not less than about 5% $Al_2O_3$, and most preferably, not less than 8% $Al_2O_3$, by weight. When reference is made herein to "aluminum formate" in relation to proportions, it will be understood that basic aluminum formate is meant.

The proportions of silica and aluminum formate in the ultimate composition should be such that the $SiO_2:Al_2O_3$ weight ratio is from 30:1 to 3:1, preferably from 25:1 to 10:1, and the ratio of aluminum to unneutralized formate in the range of 1:1.5 to 1:3.

The compositions of the invention are useful for depositing silica upon fibers to increase the soil-resistance thereof. The fibers treated can be natural, such as cotton, wool, or linen, or synthetic, such as rayon, nylon, "Orlon" polyacrylic fiber, or "Dacron" polyester fiber. Soil-resistance is noticeably increased by depositing as little as about 0.1% of $SiO_2$ by weight, based on the weight of the dry fibers. More than about 1.5% of silica on the same basis renders the fibers stiff and harsh and ordinarily will not be used. Excellent results are obtained, for example, at 0.3 to 1.0% $SiO_2$.

Since the silica exhausts out of the bath during the treatment, the amount of silica desired on the fiber is not necessarily a limitation upon the amount of the treating bath used. A bath:fiber weight ratio of about 15:1 gives excellent results on viscose rayon for deposition of about 1.5% silica, based on the fiber. A similar ratio ordinarily gives comparable results on other fibers, but a wide latitude is possible. Stated in another way, from about 1 to 3% of $SiO_2$ in the bath, based on the fiber weight, will give 50 to 75% exhaustion on viscose rayon fiber.

As already mentioned, the pH of the treating bath should be in the range of 3.0 to 5.5, preferably from 4 to 5. In the higher ratios of silica to alumina, for example 20:1, the pH is less critical; however in the $SiO_2:Al_2O_3$ ratio range of 5:1 to 10:1 the bath pH is quite important and if necessary should be adjusted with formic acid to give a pH of about 4.0.

Optionally, conventional softeners and other adjuvants can be used with the silica. Advantages of improved "hand" and better spinning properties are sometimes thereby realized. The "hand" of the treated material may be further improved by rinsing in water prior to the curing and drying operation. A water rinse will only remove excess silica from the exhausted material and after curing and drying the material will still exhibit excellent soil-resistance.

In the novel processes of this invention for increasing the soil-resistance of fibers, the fiber to be treated is immersed in a bath of the invention as above described for a period of time sufficient to effect deposition upon the fiber. Silica is thus deposited and also alumina and adjuvants may also be deposited upon the fiber. The fiber is then withdrawn from the bath, the depleted components are replenished, and a further quantity of fiber is treated. It is a major advantage of the present compositions and processes that the bath can be recycled in a practicable operation.

During use of the bath for treating fibers preferential exhaustion of one or another of the components may cause an unbalancing of the system. Therefore, in practical plant operation, it is often advantageous to readjust the bath with the desired component, and such readjustment can be made continuously. The bath can therefore be used in a continuous recirculation system. If the unbalancing becomes so great that flocculation occurs the bath can be filtered or the solids can be allowed to settle and the clear liquor can be reused after suitable adjustment of ratio and pH to within the ranges above set forth.

The above-described exhaustion processes are practical for either batch or continuous operation to exhaust silica onto natural and synthetic fibers, staple, fabrics and even rugs.

The invention will be better understood by reference to the following illustrative examples:

Example 1

A composition of the invention is prepared as follows:

*Stock solution A.*—Ten parts of weight of a 30% silica sol containing discrete, unaggregated spherical silica particles of 1 millimicrons average diameter and having an $SiO_2:Na_2O$ weight ratio of about 285:1, made as described in Rule U.S. Patent 2,577,485 and sold commercially as "Ludox" colloidal silica, was mixed with 290 parts by weight of water and the dilute sol was stirred into 1.73 parts by weight of an aqueous solution of basic aluminum formate analyzing 8.6% $Al_2O_3$. The basic aluminum formate solution used was a commercial product of Victor Chemicals Works and had the following specifications:

| | |
|---|---|
| Aluminum formate (basic solution) | $Al(OH)(COOH)_2$. |
| Color | Water white to slight amber. |
| Turbidity | Trace or none. |
| pH | 3.8–4.1. |
| CaO | 0.4% max. |
| $SO_3$ | 0.04% max. |

Typical analysis:

| | |
|---|---|
| Bé. at 25° C. | 19.0°. |
| $Al_2O_3$ | 8.69%. |
| HCOOH | 15.33%. |
| $SO_3$ | 0.022%. |
| Cl | 0.017%. |
| CaO | 0.32%. |
| Fe | 0.018%. |
| pH (as is) | 3.95. |
| Color | Water white. |

The silica content of this stock solution was about 1% and the alumina concentration about 0.05%, yielding a weight ratio of $SiO_2:Al_2O_3$ of 20:1.

*Solution B.*—Thirty parts by weight of solution A was mixed into 120 parts of water at 45° C. with good agitation. The resulting clear solution had a pH of 4.45, and was stable for a period exceeding 24 hrs.

*Process.*—Solution B was used within 24 hrs. of its preparation to treat 10 parts by weight of "Avisco" rayon staple fiber, the silica proportion being 3% $SiO_2$, based on the weight of the fiber. This staple was a product of American Viscose Corporation, having the following specifications:

| | |
|---|---|
| Filament denier | 15.0. |
| Length | 3". |
| Type | Hard finish, crimped. |
| Luster | Bright. |
| Quality | A. |

The rayon staple was treated by immersing it for 20 min. in solution B in a glass jar with baffles. The sealed glass jar was rolled on a roll mill for a uniform treatment of the fiber.

The excess solution having an end pH of 4.5 was pressed out to produce a wet pick up of about 100%, based on the dry weight of the staple. The treated staple was cured and dried in a circulating air oven at 105° C. for 30 min.

After the treatment the rayon staple contained 1.30% $SiO_2$ and 0.14% $Al_2O_3$ by analytical determination.

The discharged solution B was stable in that there was no precipitation for a period exceeding 1 hr. after removal of the rayon staple.

Excellent soil retardency was obtained by the exhaustion treatment. A synthetic soil was brushed on the treated rayon staple and excess soil was blown off with compressed air. Comparing an untreated soiled control against the treated and soiled rayon staple it was noted that excellent soil-resistance was imparted by the treatment.

Instead of using a bath containing about 3% $SiO_2$ based on the fiber weight and a weight ratio of $SiO_2:Al_2O_3$ of about 20:1, equivalent results were obtained using a bath containing only 1.5% $SiO_2$ based on the fiber weight and having an $SiO_2:Al_2O_3$ weight ratio of 10:1.

*Example 2*

This example illustrates the use of another silica:alumina ratio, viz., $SiO_2:Al_2O_3 = 10:1$.

*Stock solution A.*—Ten parts by weight of the 30% silica sol described in Example 1 was diluted with 290 parts by weight of water and this dilute silica sol was stirred into 3.55 parts by weight of the basic aluminum formate solution described in Example 1.

The silica content of this stock solution was about 1% and the alumina concentration about 0.1%.

*Solution B.*—Fifteen parts by weight of solution A was stirred into 135 parts of hot tap water (40° C.). The resulting clear solution had a pH of 4.55 and was stable for a period exceeding 24 hrs.

*Process.*—Solution B was used within 24 hrs. after its preparation to treat "Avisco" rayon staple. The treatment of the staple in solution B, squeezing, and drying was conducted in the same manner as described in Example 1. The pH of the solution B after discharge of the fiber was 4.85.

The amount of silica and aluminum deposited on the fibers by the treatment was 0.81%, as determined by ashing. The discharged solution B was stable in that there was no precipitation for a period exceeding 1 hr. after removal of the rayon staple.

Excellent soil retardency was obtained by this exhaustion technique. Soil retardency was tested as described in Example 1.

*Example 3*

In this example the treating bath had an $SiO_2:Al_2O_3$ ratio of 5:1 and was used in the proportion of 1.5% silica, based on the weight of the fiber.

*Stock solution A.*—Ten parts by weight of the 30% silica sol described in Example 1 was diluted with 283 parts by weight of water and this dilute silica sol was stirred into 7.05 parts by weight of the basic aluminum formate solution described in Example 1.

The silica content of this stock solution was about 1% and the alumina concentration about 0.2%.

*Solution B.*—Fifteen parts by weight of solution A was stirred into 135 parts of water at 40° C. The resulting clear solution had a pH of 4.35 and was stable for a period exceeding 24 hrs.

*Process.*—Solution B was used within 24 hrs. of preparation to treat "Avisco" rayon staple. Ten parts by weight of "Avisco" fibers was treated for 20 min. in solution B as described in Example 1.

After discharge of the fiber, the pH of the bath was 4.45. No flocculation of the bath occurred in the next 24 hrs. Squeezing and drying of the discharged fiber was done as described in Example 1.

Chemical analysis of the treated fiber showed that 0.31% $SiO_2$ and 0.11% $Al_2O_3$ were deposited on the rayon fiber. Good soil-resistance was imparted by the exhaustion treatment.

*Example 4*

This example illustrates the use of a more rapid treating process with a bath of Example 1, employing a softener to give improved hand to the treated fiber.

*Stock solution A.*—Ten parts by weight of the 30% silica sol of Example 1 was diluted with 290 parts by weight of water. This dilute silica sol was stirred into 1.73 parts of the basic aluminum formate solution of Example 1. The silica content of this stock solution was about 1% and the $Al_2O_3$ concentration about 0.05%.

*Solution B.*—Thirty parts by weight of stock solution A, 110 parts by weight of hot tap water, and 10 parts by weight of a 0.25% "Avcosol 100"[1] solution were mixed with vigorous stirring. The pH of this solution was adjusted to 4 with formic acid. This turbid solution, designated solution B, did not precipitate in a period exceeding 6 hrs.

*Process.*—Solution B was used within 6 hrs. after preparation to treat 10 parts by weight of "Avisco" rayon staple fibers. The rayon staple was treated for 10 min. in solution B in a glass jar as described in Example 1, squeezing and drying of the treated fibers being carried out as in Example 1. The discharged solution B was cloudy but contained no precipitate when the treated fibers were removed. The total inorganic deposit ($SiO_2$ and $Al_2O_3$) on the treated fiber was determined as 1.99% by ashing.

Soil resistance imparted by the exhaustion treatment was excellent and only slight harshness of "hand" was observed.

Employing the compositions and processes as above-described nylon, acetate rayon, cotton, "Orlon" polyacrylic fiber, and "Dacron" polyester fiber can be treated with the results as described. In each case the soil-resistance of the fiber, and of fabrics made from the treated ---
[1] "Avcosol 100" was used in this example as a softener for the treated viscose staple. It is a waxy solid, dispersible in warm water and soluble in warm mineral oil.

fiber, is increased. In no case is the fiber tenderized by the treatment.

This application is a continuation in part of our abandoned application Serial No. 562,634, filed February 1, 1956.

We claim:

1. A composition for increasing the soil-resistance of fibers, the composition comprising basic aluminum formate and a silica sol in which the silica is present as substantially discrete particles having an average diameter from 3 to 150 millimicrons, the composition having a pH of from 3.0 to 5.5 and the weight ratio of silica, analyzed and expressed as $SiO_2$, to basic aluminum formate, analyzed and expressed as $Al_2O_3$, being from 30.1 to 3:1.

2. A composition for increasing the soil-resistance of fibers, the composition comprising basic aluminum formate and a silica sol in which the silica is present as substantially discrete particles having an average diameter from 3 to 150 millimicrons, the composition having a pH of from 4 to 5 and the weight ratio of silica, analyzed and expressed as $SiO_2$, to basic aluminum formate, analyzed and expressed as $Al_2O_3$, being from 25:1 to 10.1.

3. A composition for increasing the soil-resistance of fibers, the composition comprising basic aluminum formate and a silica sol in which the silica is present as substantially discrete particles having an average diameter from 5 to 20 millimicrons, the composition having a pH of from 3.0 to 5.5 and the weight ratio of silica, analyzed and expressed as $SiO_2$, to basic aluminum formate, analyzed and expressed as $Al_2O_3$, being from 30:1 to 3:1.

4. A composition for increasing the soil-resistance of fibers, the composition comprising basic aluminum formate and a silica sol in which the silica is present as substantially discrete particles having an average diameter of from 5 to 20 millimicrons, the composition having a pH of from 4 to 5 and the weight ratio of silica, analyzed and expressed as $SiO_2$, to basic aluminum formate, analyzed and expressed as $Al_2O_3$, being from 25:1 to 10:1.

5. In a process for producing a composition comprising a silica sol and basic aluminum formate, the step comprising preparing an aqueous basic aluminum formate solution having an aluminum:formate mol ratio of up to 1:2 and containing basic aluminum formate, in such proportion that the solution analyzes not less than .3% by weight of $Al_2O_3$, adding a silica sol in which the silica is present as substantially discrete particles having an average diameter of 3 to 150 millimicrons, the addition being effected under conditions of substantially instantaneous mixing, the pH of the mixture being in the range from 3.0 to 5.5 and the proportion of silica sol and basic aluminum formate being such that the weight ratio of silica, analyzed and expressed as $SiO_2$, to basic aluminum formate, analyzed and expressed as $Al_2O_3$, is from 30:1 to 3:1.

6. In a process for increasing the soil-resistance of fibers the steps comprising immersing a fiber in a bath comprising basic aluminum formate and a silica sol in which the silica is present as substantially discrete particles having an average diameter from 3 to 150 millimicrons, said bath having a pH of from 3.0 to 5.5 and containing silica and basic aluminum formate in such proportion that the weight ratio of silica, analyzed and expressed as $SiO_2$, to basic aluminum formate, analyzed and expressed as $Al_2O_3$, is from 30:1 to 3:1, whereby a component of the bath is deposited upon the fiber, withdrawing the fiber from the bath, replenishing the depleted bath component, and again immersing a fiber in the bath.

References Cited in the file of this patent

UNITED STATES PATENTS

| | | |
|---|---|---|
| 2,154,170 | Kramer | Apr. 11, 1939 |
| 2,236,074 | Schwartz | Mar. 25, 1941 |
| 2,622,307 | Cogovan et al. | Dec. 23, 1952 |
| 2,696,444 | Rossin | Dec. 7, 1954 |
| 2,737,446 | Hoffmann | Mar. 6, 1956 |
| 2,786,787 | Florio | Mar. 26, 1957 |
| 2,788,295 | Cooke et al. | Apr. 9, 1957 |

UNITED STATES PATENT OFFICE

CERTIFICATE OF CORRECTION

Patent No. 2,891,874                                                          June 23, 1959

Ralph Aarons et al.

It is hereby certified that error appears in the printed specification of the above numbered patent requiring correction and that the said Letters Patent should read as corrected below.

Column 4, line 57, for "1" read -- 17 --; column 7, line 14, for "30.1" read -- 30:1 --; line 22, for "10.1" read -- 10:1 --.

Signed and sealed this 12th day of January 1960.

(SEAL)
Attest:

KARL H. AXLINE                                                    ROBERT C. WATSON
Attesting Officer                                          Commissioner of Patents